United States Patent
Zhang

(10) Patent No.: US 10,752,812 B2
(45) Date of Patent: Aug. 25, 2020

(54) AUTOMATIC PACKAGING FILM AND PREPARATION METHOD THEREFOR

(71) Applicant: HAIAN XIN FU YUAN OF AGRICULTURAL SCIENCE AND TECHNOLOGY CO., LTD, Nantong (CN)

(72) Inventor: Ziyu Zhang, Nantong (CN)

(73) Assignee: HAIAN XIN FU YUAN OF AGRICULTURAL SCIENCE AND TECHNOLOGY CO., LTD, Nantong (CN)

(*) Notice: Subject to any disclaimer, the term of this patent is extended or adjusted under 35 U.S.C. 154(b) by 0 days.

(21) Appl. No.: 16/323,258

(22) PCT Filed: May 10, 2017

(86) PCT No.: PCT/CN2017/083741
§ 371 (c)(1),
(2) Date: Feb. 5, 2019

(87) PCT Pub. No.: WO2018/201509
PCT Pub. Date: Nov. 8, 2018

(65) Prior Publication Data
US 2019/0185722 A1   Jun. 20, 2019

(30) Foreign Application Priority Data

May 4, 2017   (CN) .......................... 2017 1 0307870

(51) Int. Cl.
*B65D 65/14*   (2006.01)
*C09J 9/00*   (2006.01)
(Continued)

(52) U.S. Cl.
CPC ................. *C09J 9/00* (2013.01); *B32B 27/36* (2013.01); *B65D 65/14* (2013.01); *C09J 7/243* (2018.01);
(Continued)

(58) Field of Classification Search
CPC . B65D 65/14; C09J 2201/28; C09J 2201/122; C09J 2203/342
See application file for complete search history.

(56) References Cited

FOREIGN PATENT DOCUMENTS

| CN | 1371411 | 9/2002 |
|---|---|---|
| CN | 202030693 | 11/2011 |

(Continued)

*Primary Examiner* — Alexander S Thomas
(74) *Attorney, Agent, or Firm* — Treasure IP Group, LLC

(57) ABSTRACT

The invention aims to provide automatic packaging film and a method for preparing the same. Mutually parallel adhesive areas (2) are arranged at intervals laterally on the same side of the film substrate, a non-adhesive area (1) is formed between two adhesive areas (2), and each non-adhesive area (1) and an adjacent adhesive area (2) form a packaging section; between the adjacent packaging sections, the non-adhesive area (1) of a packaging section and the adhesive area (2) of a next packaging section are connected through a separable splicing tape; all the packaging sections are connected through separable splicing tapes to form an entire continuous automatic packaging film (3). The invention solves the technical problems that the film is stuck or broken during automatic packaging, leading to machine shutdown and thus failure of automatic packaging.

2 Claims, 2 Drawing Sheets

(51) Int. Cl.
*C09J 201/00* (2006.01)
*C09J 7/24* (2018.01)
*C09J 7/30* (2018.01)
*B32B 27/36* (2006.01)

(52) U.S. Cl.
CPC ............... *C09J 7/30* (2018.01); *C09J 201/00* (2013.01); *C09J 2201/122* (2013.01); *C09J 2201/28* (2013.01); *C09J 2203/342* (2013.01); *C09J 2423/046* (2013.01); *Y10T 428/2486* (2015.01); *Y10T 428/24851* (2015.01)

(56) References Cited

FOREIGN PATENT DOCUMENTS

| | | |
|---|---|---|
| CN | 203428190 | 11/2011 |
| EP | 0060214 | 9/1982 |

AUTOMATIC PACKAGING FILM AND PREPARATION METHOD THEREFOR

CROSS REFERENCE TO RELATED APPLICATION

This application is a national stage application of a PCT application PCT/CN2017/083741, May 10, 2017, entitled "Automatic Packaging Film and a Method for Preparing the Same," which further takes priority of a Chinese application 201710307870.7, filed on May 4, 2017. The international application and Chinese priority application are incorporated herein by reference in their entireties.

TECHNICAL FIELD

The invention relates to packaging material, especially automatic packaging film and a method for preparing the same, which belong to the chemical material field.

BACKGROUND TECHNOLOGY

Roll films are applied in the packaging industry mainly because the cost of the entire packaging process can be saved. When roll films are applied in automatic packaging machines, package manufacturers do not need to do any sealing works, but only need to do one-time sealing operation. Emergence of roll films simplifies the entire plastic packaging process into three steps of printing, transportation and packaging, thus greatly simplifying the packaging process, and reducing costs in the whole industry.

Currently, automatic packaging film is formed by coextrusion-laminating two or three layers of materials. OPP, CPP, PE, PET, PP, PVC, aluminum-coated foil, pure aluminum foil, coated paper, etc. of different specifications can be combined as required by customers for production and processing. The main film substrates of compound bags include outer printable film BOPA BOPET BOPP, inner heat-sealable film CPP PE and coextruded film. Generally, the above mentioned materials, as middle layers, are laminated through adhesive into laminated film.

In the past production process, each complete package requires to laminate film of two different materials and then attach a two-side adhesive tape and a one-side adhesive tape between the two materials. The production process has disadvantages that the technological process is complex and inefficient, the adhesive tapes easily get detached, film jamming and breakage and machine shutdown easily occur in the automatic packaging process, and thus automatic packaging fails.

DESCRIPTION OF INVENTION

Technical problem: the invention aims to provide automatic packaging film and a method for preparing the same, in order to solve the technical problems that the film is stuck or broken during automatic packaging, leading to machine shutdown and thus failure of automatic packaging.

Technical scheme: in order to achieve the above mentioned purpose, the automatic packaging film provided by the invention: mutually parallel adhesive zones are arranged at intervals laterally on the same side of the film substrate, a non-adhesive zone is formed between two adhesive zones, and each non-adhesive zone and an adjacent adhesive zone form a packaging section; between the adjacent packaging sections, the non-adhesive zone of a packaging section and the adhesive zone of a next packaging section are connected through a separable splicing tape; all the packaging sections are connected through separable splicing tapes to form an entire continuous automatic packaging film.

The separable splicing tape is a U-shaped adhesive tape composed of adhesive, a double-side adhesive substrate, a separable layer and a strong adhesive layer; wherein, the double-side adhesive substrate is folded into U shape, one of the folded sides of the U shape is adhered onto the side end of the non-adhesive zone through the adhesive, the other folded side thereof is adhered onto the side end of the adhesive zone through the strong adhesive layer; the separable layer is positioned between the strong adhesive layer and the double-side adhesive substrate to be used for separation during packaging.

The method for preparing the automatic packaging film of the invention comprises the following steps:
1) Adhesive layers are coated at intervals laterally on the same side of the film substrate to form the adhesive zones, the non-adhesive zone is formed between two adjacent adhesive zones, each non-adhesive zone and an adjacent adhesive zone form a packaging section, and thus an entire semi-product packaging material is obtained;
2) The semi-product packaging material is positioned into a rewinder, two adjacent packaging sections are cut off, and the U-shaped adhesive tape is adhered between the non-adhesive zone and the adhesive zone which are cut off; namely, the double-side adhesive substrate is adhered on the non-adhesive film via the adhesive and on the adhesive film via the strong adhesive layer, and the separable layer is positioned between the strong adhesive layer and the double-side adhesive substrate;
3) The above mentioned step 2) is repeated to connect the packaging sections via the U-shaped adhesive tapes to form a continuous packaging material, which is a complete automatic packaging film after being wound.

When the packed article is formed, an acting force reverse to the automatic packaging film exists. Since the joint has a separable layer, the strong adhesive layer separates the separable layer automatically under the reverse acting force, and then seals the joints of the film packing the packed article through strong adhesive after separation.

Beneficial effects: compared to the existing technology, the invention has the following beneficial effects:

1. In the invention, the substrate is coated at intervals, and only one film roll needs to be unwound rather than two film rolls of different materials during rewinding, thus solving the technical problem of complex technological process in the film production process, and greatly improving the efficiency.

2. In the invention, adjacent packaging sections are connected via the U-shaped adhesive tapes, so that the film joints do not need to be flipped or reversed during rewinding; the film joints are flat, smooth, firm, and not overlapped. The invention solves the technical problems that the film is stuck or broken during automatic packaging, leading to machine shutdown and thus failure of automatic packaging.

3. In the invention, the U-shaped adhesive tapes are used, one less layer of one-side adhesive joints is made during rewinding, the joints are sealed through strong adhesive, thus the joint adhesion quality is improved, packaging can be completed automatically only by opening the adhesive tape joints when in use, and the working procedures are reduced.

Figure 1:
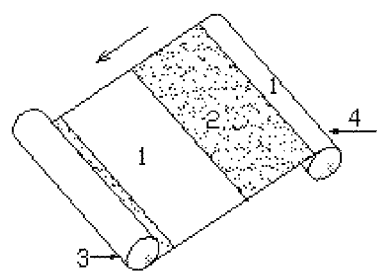
FIGS. 1, 2 and 3 are diagrams showing steps of making the automatic packaging film of the invention.

The diagrams contain the non-adhesive zone 1, the adhesive zone 2, the automatic packaging film 3, the semi-product packing material 4, the packed article 5, the U-shaped adhesive tape 6, the adhesive 6B, the double-side substrate 6D, the separable layer 6C and the strong adhesive layer 6A.

DETAIL DESCRIPTION OF EMBODIMENTS

In the automatic packaging film provided by the invention, mutually parallel adhesive zones 2 are arranged at intervals laterally on the same side of the film substrate, a non-adhesive zone 1 is formed between two adhesive zones 2, each non-adhesive zone 1 and an adjacent adhesive zone 2 form a packaging section, the non-adhesive zone 1 and the adhesive zone 2 of adjacent packaging sections are connected through a U-shaped adhesive tape 6, and the U-shaped adhesive tape 6 is composed of adhesive 6B, a double-side adhesive substrate 6D, a separable layer 6C and a strong adhesive layer 6A; wherein, the double-side adhesive substrate 6D is adhered on the non-adhesive film 1 via the adhesive 6B and on the adhesive film 2 via the strong adhesive layer 6A, and the separable layer 6C is positioned between the strong adhesive layer 6A and the double-side adhesive substrate 6D; the packaging sections are connected via the U-shaped adhesive tapes 6 to form continuous packaging film 3; when the packed article 5 is formed, an acting force reverse to the automatic packaging film 3 exists. Since the joint has the separable layer 6C, the strong adhesive layer 6A separates the separable layer automatically under the acting force, and then seals the joints through strong adhesive after separation.

The substrate in the invention can be made of polyolefin, polyethylene or other appropriate polymeric materials, like pvc, opp, pe, pet or pp. However, the substrate materials are not limited to the above mentioned materials and can comprise meshes or other appropriate packaging materials, either natural or artificial.

The invention will be further explained in combination with the attached drawings:

Embodiment 1

As shown in FIG. 1, 2700 mm PE film is produced through a three-layer coextrusion tape casting machine and coated with 8.5 m adhesive at intervals of 10.5 m to form adhesive film 2, each non-adhesive film zone 1 and adhesive film zone 2 form a packaging section, and the semi-product packaging material 4 with 10.5 m non-adhesive film and 8.5 m adhesive film which are arranged at intervals is obtained; the length and width of the packaging material can be changed according to the size and shape of the article to be packed and the package purpose.

Figure 2:
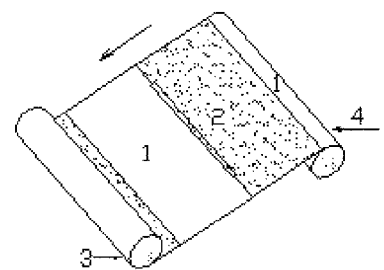
Figure 3:
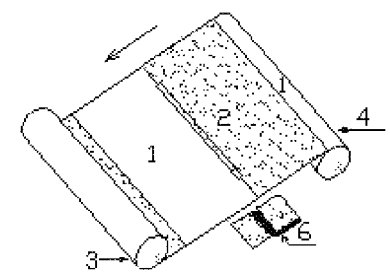

As shown in FIG. 2, the semi-product packaging material 4 is positioned in a rewinder to cut off the joint between the adhesive film 2 and the non-adhesive film 1 of adjacent packaging sections;

As shown in FIG. 3, the U-shaped adhesive tape 6 is adhered between the non-adhesive zone 1 and the adhesive zone 2 which are cut off, the double-side adhesive substrate 6D is adhered on the side end of the non-adhesive film 1 via the adhesive 6B and on the side end of the adhesive film 2 via the strong adhesive layer 6A, and the separable layer 6C is positioned between the strong adhesive layer 6A and the double-side adhesive substrate 6D; the U-shaped adhesive tape 6 is adhered on the same side surfaces of the non-adhesive zone 1 and the adhesive zone 2, and the packaging sections are connected via the U-shaped adhesive tapes 6 to form continuous packaging film 3.

Figure 4:
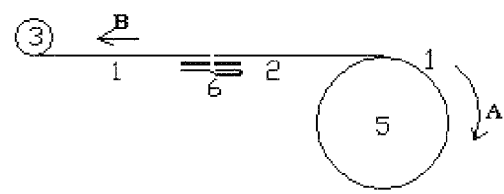
FIGS. 4, 5 and 6 are diagrams showing steps of packaging an article by using the invention in an embodiment.

As shown in FIG. 4, the packed article 5 begins to be formed and the film starts moving in the automatic packaging process; the U-shaped double-side adhesive tape 6 connects the non-adhesive zone 1 and the adhesive zone 2.

Figure 5:
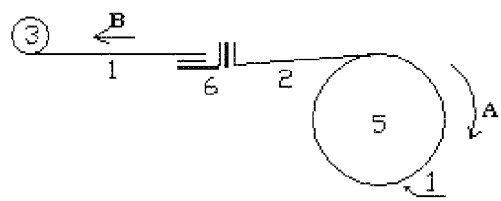

As shown in FIG. 5, the film starts moving, the packed article 5 begins to be formed and continues rotating along the clockwise direction A; when the packed article 5 is formed, an acting force reverse to the automatic packaging film 3 exists, which separates the joint of the separable layer; the separable layer 6C can be made of any appropriate materials with low adhesion characteristic, like siloxane, but not limited hereto.

Figure 6:
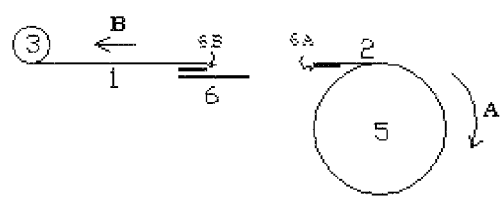

As shown in FIG. 6, when the automatic packaging film 3 stops moving and the packed article 5 continues moving, separation of the separable layer 6C is completed.

When the packed article 5 reaches the set value, the non-adhesive film 1 is wrapped around the packed article 5 for two loops and then the adhesive film 2 is wrapped around the non-adhesive film 1 for one loop, ensuring that the packed article not easily get loose with the adhesive film 2 closely attached on the non-adhesive film 1. The packed article 5 is completely wrapped by the adhesive film 2, continuous movement of the packed article 5 leads to separation of the U-shaped double-side adhesive tape 6, thus the separable layer 6C is automatically separated under the acting force, and the strong adhesive layer 6A seals the joint with the strong adhesive after separation.

Figure 7:
FIG. 7 is the structural diagram of the U-shaped adhesive tape before separation.
Figure 8:
FIG. 8 is the structural diagram of the U-shaped adhesive tape during separation.
Figure 9:
FIG. 9 is the structural diagram of the U-shaped adhesive tape after separation.

FIG. 7 shows the pre-separation state of the U-shaped double-side adhesive, where the double-side adhesive substrate 6D is adhered on the side end of the non-adhesive film 1 via the adhesive 6B and on the side end of the adhesive film 2 via the strong adhesive layer 6A, and the separable layer 6C is positioned between the strong adhesive layer 6A and the double-side adhesive substrate 6D;

FIG. 8 shows the state of the U-shaped double-side adhesive during separation, where the separable layer 6C is gradually separated from the strong adhesive layer 6A;

FIG. 9 shows the state of the U-shaped double-side adhesive after separation, where the separable layer 6C is completely separated from the strong adhesive layer 6A.

In the invention, in the complete package of each packed article, no joint exists between the non-adhesive film 1 and the adhesive film 2 which form an entire piece of film, only an adhesive tape needs to be attached at the junction between the adhesive film and the non-adhesive film during rewinding, and packaging can be completed automatically only by opening the adhesive tape joint when in use.

The invention claimed is:

1. An automatic packaging film, comprising
mutually parallel adhesive areas (2) are arranged at intervals laterally on a same side of a film substrate,
a non-adhesive area (1) is formed between two adhesive areas (2), and
each non-adhesive area (1) and an adjacent adhesive area (2) form a packaging section;
between the adjacent packaging sections, the non-adhesive area (1) of the packaging section and the adhesive area (2) of a next packaging section are connected through a separable splicing tape;

all the packaging sections are connected through separable splicing tapes to form an entire continuous automatic packaging film (3);

wherein each separable splicing tape is a U-shaped adhesive tape (6), and is composed of adhesive (6B), a double-side adhesive substrate (6D), a separable layer (6C) and a strong adhesive layer (6A); wherein, the double-side adhesive substrate (6D) is folded into a U shape, one of the folded sides of the U shape is adhered onto a side end of the non-adhesive area (1) through the adhesive (6B), the other folded side thereof is adhered onto the side end of the adhesive area (2) through the strong adhesive layer (6A); the separable layer (6C) is positioned between the strong adhesive layer (6A) and the double-side adhesive substrate (6D) to be used for separation during packaging.

2. A method for preparing an automatic packaging film comprises the following steps:

(1) coating adhesive layers at intervals laterally on a same side of the film substrate to form adhesive areas (2), forming a non-adhesive area (1) between two adjacent adhesive areas (2), forming a packaging section through each non-adhesive area (1) and an adjacent adhesive area (2), and thus an entire semi-product packaging material (4) is obtained;

(2) placing semi-finished packaging material (4) into a rewinder, disconnect two adjacent packaging sections by cutting, and binding a U-shaped adhesive tape (6) between the cut non-adhesive area (1) and the adhesive area (2);

wherein a double-side adhesive substrate (6D) is adhered to the non-adhesive film (1) by an adhesive (6B), and the double-side adhesive substrate (6D) is adhered to the adhesive film (2) by a strong adhesive layer (6A), and a separable layer (6C) is positioned between the strong adhesive layer (6A) and the double-side adhesive substrate (6D);

(3) repeating above-mentioned step to connect the packaging sections by the U-shaped adhesive tapes (6) to form a continuous packaging material, and obtaining a complete automatic packaging film (3) after being wound.

* * * * *